UNITED STATES PATENT OFFICE.

LORENZO DUFOUR, OF GENOA, ITALY.

PROCESS OF DECOLORIZING TANNIC EXTRACTS.

No. 878,618. Specification of Letters Patent. Patented Feb. 11, 1908.

Application filed July 25, 1906. Serial No. 327,690.

*To all whom it may concern:*

Be it known that I, LORENZO DUFOUR, subject of the King of Italy, residing at Genoa, Italy, have invented certain new and useful Improvements in Processes of Decolorizing Tannic Extracts, of which the following is a specification.

Having observed the singular reducing and decolorizing properties of a mixture of hypophosphite and a sulfite in acid solution, or a mixture of hypophosphoric and phosphoric acid with sulfurous acid I use this property in connection with the decolorization of tannic extracts.

I have further observed that by the addition of formaldehyde to the said mixture its reducing properties and stability are materially increased, and that a certain degree of heating is necessary to obtain complete decolorization.

In order that my said invention may be clearly understood I will say by way of example that a mixture of 1 part of hypophosphite and 4–5 parts of sulfite or bisulfite with the addition of a quantity of acid capable of displacing the sulfurous acid, and the eventual addition of formaldehyde has given the most satisfactory results, the degree of heating being variable according to the quality of extract to be decolorized. I will give hereunder two practical examples:

1. I take 1000 kg. of extract of quebracho at 25° Bé. heated up to fluid condition and add thereto 3 kg. of sodic hypophosphite and 15 kg. of sodic bisulfite dissolved in water, thoroughly mixing together the whole: I then add 5 kg. of sulfuric acid at 40° Bé. and after having been mixed thoroughly the whole is heated to 60°–80° C. for some hours, and a very efficient decolorization will thereby be obtained.

2. To 1000 kg. of extract of mangrove bark at 25° Bé. I add 5 kg. of sodic hypophosphite and 20 kg. of sodic bisulfite dissolved in a little water, thoroughly mixing together the whole. I then add 7 kg. sulfuric acid at 40° Bé. and 5 kg. of formalin of standard strength and when thoroughly mixed I heat up to 83°–100° C. for some hours, and obtain a very remarkable decolorization thereby.

In analogous manner as the above two extracts all the other extracts to be used for tanning may be treated, only varying the quantity of decolorant and the degree of heating according to the particular properties of the extract to be decolorized.

Having now fully described my said invention and the manner in which the same is to be performed, what I claim and desire to secure by Letters Patent of the United States is:—

1. A process of treating tannic extracts which consists in adding thereto a reducing agent comprising in separate combinations the sulfurous acid radical and the phosphorous acid radical and adding thereto an acid capable of displacing the said radicals, substantially as described.

2. A process of treating tannic extracts which consists in adding thereto a reducing agent comprising in separate combinations the sulfurous acid radical and the phosphorous acid radical, adding thereto an acid capable of displacing the said radicals and heating the mixture, substantially as described.

3. A process of treating tannic extracts which consists in adding thereto a reducing agent comprising in separate combinations the sulfurous acid radical and the phosphorous acid radical, said reducing agent being associated with formaldehyde and adding thereto an acid capable of displacing the said radicals.

4. A process of treating tannic extracts which consists in adding thereto a reducing agent comprising in separate combinations the sulfurous acid radical and the phosphorous acid radical, said reducing agent being associated with formaldehyde, adding thereto an acid capable of displacing the said radicals and heating the mixture, substantially as described.

In testimony whereof I have affixed my signature in presence of two witnesses.

LORENZO DUFOUR.

Witnesses:
 TOMASO MASSA,
 GUIZEPPE MACCAGUI.